United States Patent
Bostick et al.

(10) Patent No.: US 9,762,722 B2
(45) Date of Patent: Sep. 12, 2017

(54) LOCATION-BASED AND TIME-BASED MOBILE DEVICE SECURITY

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Stephen G. Meyer, Chicago, IL (US); Kimberly G. Starks, Nashville, TN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 116 days.

(21) Appl. No.: 14/543,190

(22) Filed: Nov. 17, 2014

(65) Prior Publication Data

US 2016/0142532 A1    May 19, 2016

(51) Int. Cl.
*H04W 4/02* (2009.01)
*H04M 1/725* (2006.01)
*H04W 12/06* (2009.01)
*H04W 12/08* (2009.01)
*H04L 29/06* (2006.01)

(52) U.S. Cl.
CPC ...... *H04M 1/72577* (2013.01); *H04L 63/083* (2013.01); *H04L 63/107* (2013.01); *H04W 4/021* (2013.01); *H04W 12/06* (2013.01); *H04W 12/08* (2013.01); *H04M 1/72572* (2013.01)

(58) Field of Classification Search
CPC ....... H04W 4/021; H04W 4/02; H04W 12/06; H04W 12/08; H04W 4/001; H04W 64/00; H04W 4/023; H04W 4/025; H04W 4/18
USPC ....... 455/456.1–457, 410, 411; 726/4, 5, 17, 726/18, 27–30
See application file for complete search history.

(56) References Cited

U.S. PATENT DOCUMENTS

| 8,412,158 | B2 | 4/2013 | Forutanpour et al. |
| 8,521,131 | B1 | 8/2013 | Ramalingam et al. |
| (Continued) | | | |

FOREIGN PATENT DOCUMENTS

| CN | 103369463 | 10/2013 |
| WO | 2008100543 | 8/2008 |

OTHER PUBLICATIONS

Anonymous., "System and method of finding a lost/stolen mobile device which is not accessible by the owner"., IPCOM000223683D, Publication date Nov. 23, 2012, 4 pages.

*Primary Examiner* — Allahyar Kasraian
(74) *Attorney, Agent, or Firm* — Lisa Ulrich; Andrew M. Calderon; Roberts Mlotkowski Safran Cole & Calderon, P.C.

(57) ABSTRACT

Approaches are provided for preventing unauthorized access to mobile devices. An approach includes determining at least one of connectivity and a geolocation of a mobile device. The approach further includes analyzing the at least one of the connectivity and the geolocation of the mobile device with respect to one or more safe zones that are enabled on the mobile device. The approach further includes enabling or disabling the one or more security systems for the mobile device based on one or more security profiles associated with the one or more safe zones and the analysis of the at least one of the connectivity and the geolocation of the mobile device with respect to the one or more safe zones.

12 Claims, 4 Drawing Sheets

(56) References Cited

U.S. PATENT DOCUMENTS

| | | |
|---|---|---|
| 8,606,021 B2 | 12/2013 | Conwell |
| 2005/0202830 A1 | 9/2005 | Sudit |
| 2006/0166678 A1* | 7/2006 | Karaoguz ............. H04M 1/006 455/456.1 |
| 2008/0031194 A1* | 2/2008 | Yaqub ................... H04L 63/062 370/331 |
| 2009/0253410 A1 | 10/2009 | Fitzgerald et al. |
| 2010/0173607 A1 | 7/2010 | Thornton et al. |
| 2010/0250136 A1 | 9/2010 | Chen |
| 2011/0141276 A1 | 6/2011 | Borghei |
| 2013/0013932 A1 | 1/2013 | Kong et al. |
| 2013/0055361 A1 | 2/2013 | Walsh |
| 2013/0061147 A1 | 3/2013 | Beaurepaire |
| 2014/0045457 A1 | 2/2014 | Mahaffey et al. |
| 2015/0024773 A1* | 1/2015 | Li ......................... H04W 4/021 455/456.1 |
| 2015/0050922 A1* | 2/2015 | Ramalingam ......... H04W 12/08 455/418 |
| 2016/0007203 A1* | 1/2016 | Hassan ................... G06F 21/31 455/456.4 |

\* cited by examiner

LOCATION-BASED AND TIME-BASED MOBILE DEVICE SECURITY

FIELD OF THE INVENTION

The present invention generally relates to mobile device security, and more particularly, to systems and methods for preventing unauthorized access to mobile devices.

BACKGROUND

Mobile devices, such as smart phones, tablet computers, and other portable electronic computing devices, typically store various kinds of personal and business information (e.g., online banking passwords, corporate documents, network access credentials, etc.). Preventing this information from getting in the wrong hands is a principal concern of many mobile device users. To this end, many mobile devices have a security feature that allows a user to lock a mobile device such that unauthorized users cannot access the mobile device, or one or more of the mobile device's applications to retrieve such information, without entering a password or other token of user authentication.

Another security feature on some mobile devices involves remotely wiping data from the mobile device if the mobile device is lost or stolen. There are presently several systems to remotely wipe the information on a mobile device, such as installing an application on the mobile device, using a management console on the information technology side, or signing up for a cloud-based service. In either instance, the remote wipe is typically performed by sending a remote wipe command to the mobile device. The mobile device includes software or an application module that recognizes the remote wipe command and proceeds to remotely wipe the information currently stored on the mobile device. Nevertheless, the security features described above have disadvantages and limitations such as a mobile device user's failure to lock their mobile device, the inability to wipe the information when the mobile device is unable to receive the remote wipe commend, and the inability to control which information is wiped.

SUMMARY

In a first aspect of the invention, a method is provided for that includes creating and defining one or more safe zones for a mobile device. The method further includes enabling at least one of the one or more safe zones. The method further includes creating and configuring a security profile for the at least one of the one or more safe zones. The method further includes determining at least one of connectivity and a geolocation of the mobile device. The method further includes analyzing the at least one of the connectivity and the geolocation of the mobile device with respect to the at least one of the one or more safe zones. The method further includes automatically enabling or disabling one or more security systems for the mobile device based on the security profile and the analysis of the at least one of the connectivity and the geolocation of the mobile device with respect to the at least one of the one or more safe zones.

In another aspect of the invention, a computer program product is provided for enabling or disabling one or more security systems for one or more applications, files, or folders on a mobile device based on at least one of connectivity and a geolocation of a mobile device. The computer program product includes a computer readable storage medium having program instructions embodied therewith. The computer readable storage medium is not a transitory signal per se, and the program instructions are readable by a computing device to cause the computing device to perform a method that includes determining the at least one of the connectivity and the geolocation of the mobile device. The method further includes analyzing the at least one of the connectivity and the geolocation of the mobile device with respect to one or more safe zones that are enabled on the mobile device. The method further includes enabling or disabling the one or more security systems for the one or more applications, files, or folders on the mobile device based on one or more security profiles associated with the one or more safe zones and the analysis of the at least one of the connectivity and the geolocation of the mobile device with respect to the one or more safe zones.

In a further aspect of the invention, a method is provided for that includes creating and configuring an automatic wipe security profile for a mobile device. The security profile comprising one or more actions that are required to be performed prior to a scheduled time elapsing in order to prevent an automatic wipe of data on the mobile device. The method further includes determining whether the one or more actions are performed. The method further includes that when the one or more actions are not performed, determining whether the scheduled time has elapsed. The method further includes that when the scheduled time has elapsed, performing the automatic wipe of the data on the mobile device.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
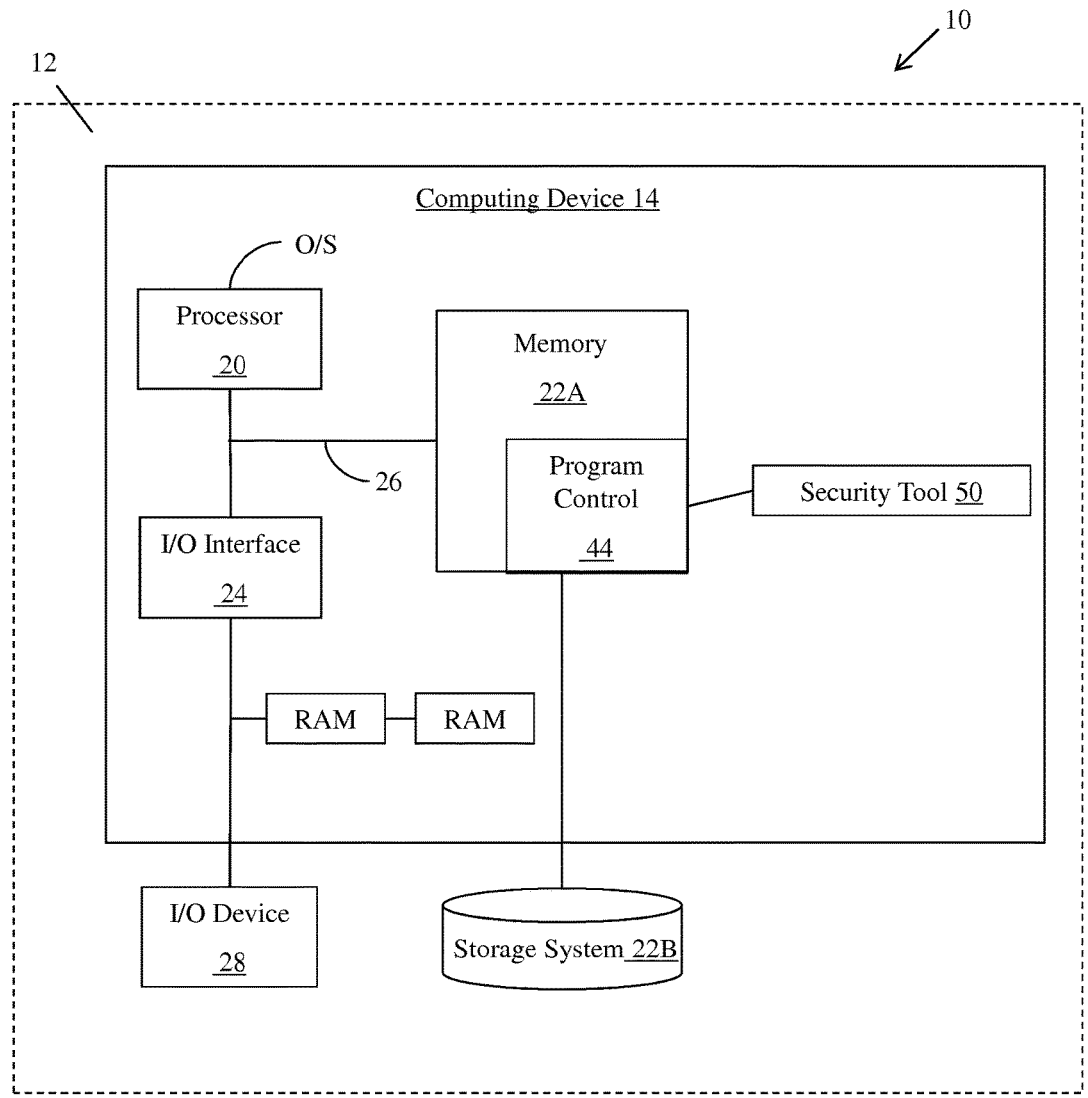
FIG. 1 shows an illustrative environment for implementing the steps in accordance with aspects of the invention.

The present invention generally relates to mobile device security, and more particularly, to systems and methods for preventing unauthorized access to mobile devices. More specifically, implementations of the invention provide systems and methods that allow for a decreased or increased standard of security based on connectivity and/or a geolocation of a mobile device. In other embodiments, implementations of the invention provide systems and methods that initiate automatic wiping of information on the mobile device or automatic locking of the mobile device from any and all use based on timing. In additional or alternative embodiments, implementations of the invention provide systems and methods that provide for configurable protection levels at an application, folder, or file level. The present invention provides many advantages over conventional mobile device security systems and methods, which do not leverage built in knowledge within the mobile device to determine when and how the mobile device should implement a decreased or increased standard of security.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., graphic user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a security tool 50, which performs processes described herein. The security tool 50 can be implemented as one or more program code in program control 44 stored in memory 22A as separate or combined modules. Additionally, the security tool 50 may be implemented as separate dedicated processors or a single or several processors to provide the function of the security tool 50. While executing the computer program code, the processor 20 can read and/or write data to/from memory 22A, storage system 22B, and/or I/O interface 24. The program code executes the processes of the invention. The bus 26 provides a communications link between each of the components in computing device 14.

Figure 2:
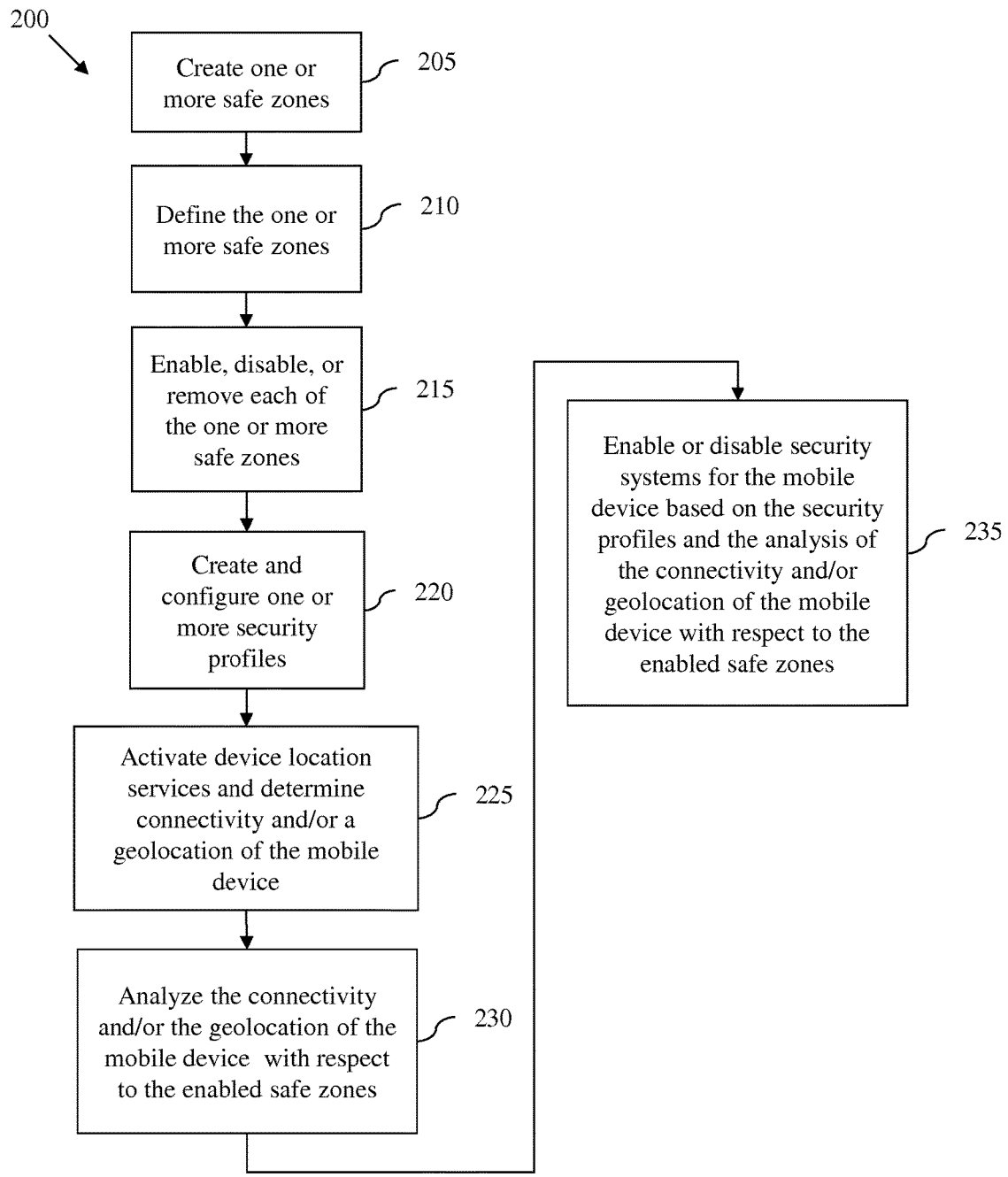
FIGS. 2-4 show exemplary flows in accordance with aspects of the invention.

By way of example, in embodiments the security tool 50 may be configured to provide the functionality of enabling or disabling one or more security systems of a mobile device based on connectivity and/or a geolocation of a mobile device, as described herein with respect to FIG. 2. In additional embodiments, the security tool 50 may be further configured to provide the functionality of invoking an automatic wipe or lock of a mobile device, as described herein with respect to FIG. 3. In yet additional embodiments, the security tool 50 may be further configured to provide the functionality of configuring protection levels at an application, folder, or file level, as described herein with respect to FIG. 4.

The computing device 14 can comprise any general purpose computing article of manufacture capable of executing computer program code installed thereon (e.g., a personal computer, a mobile device, a server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code.

In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 3:
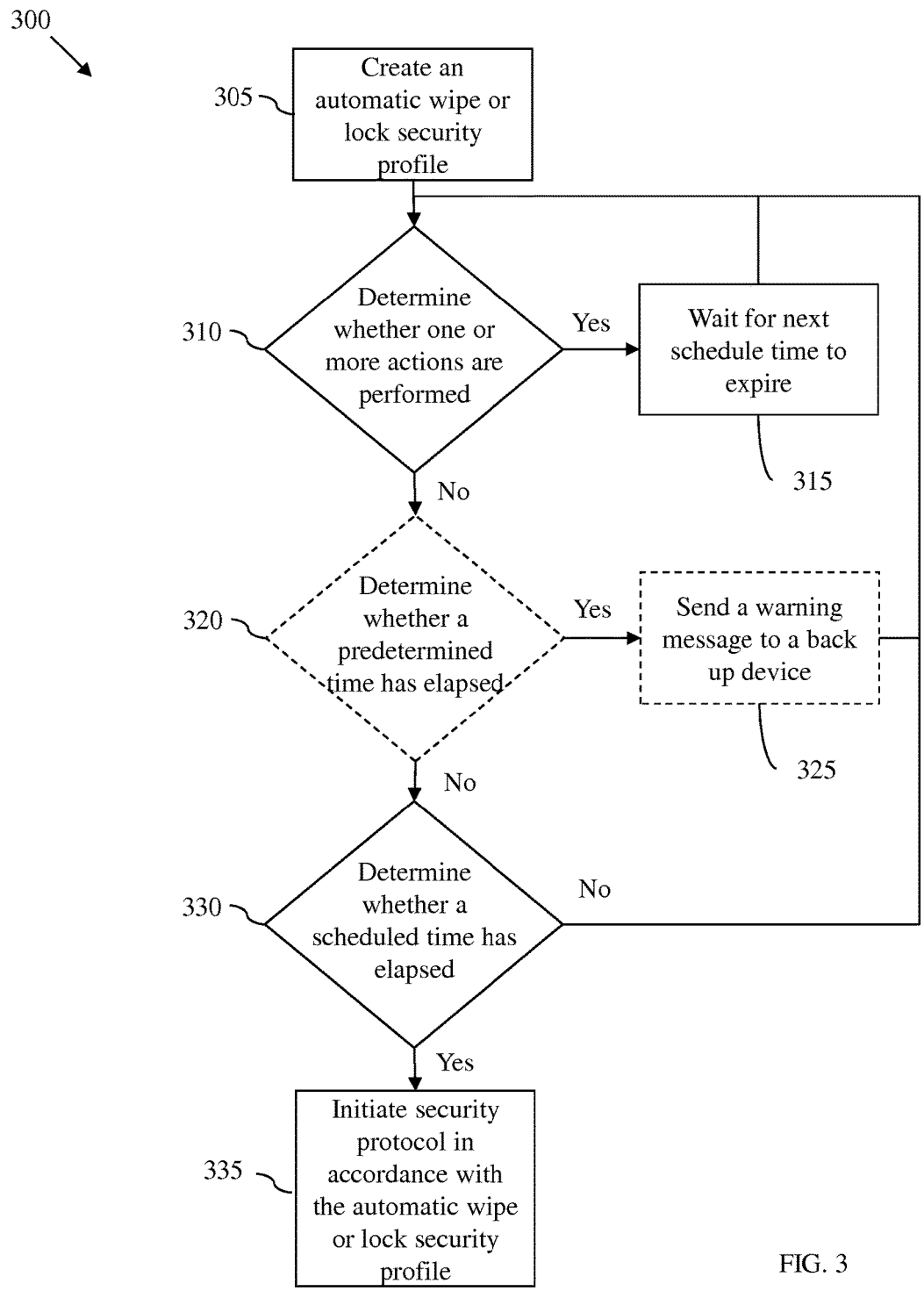
Figure 4:
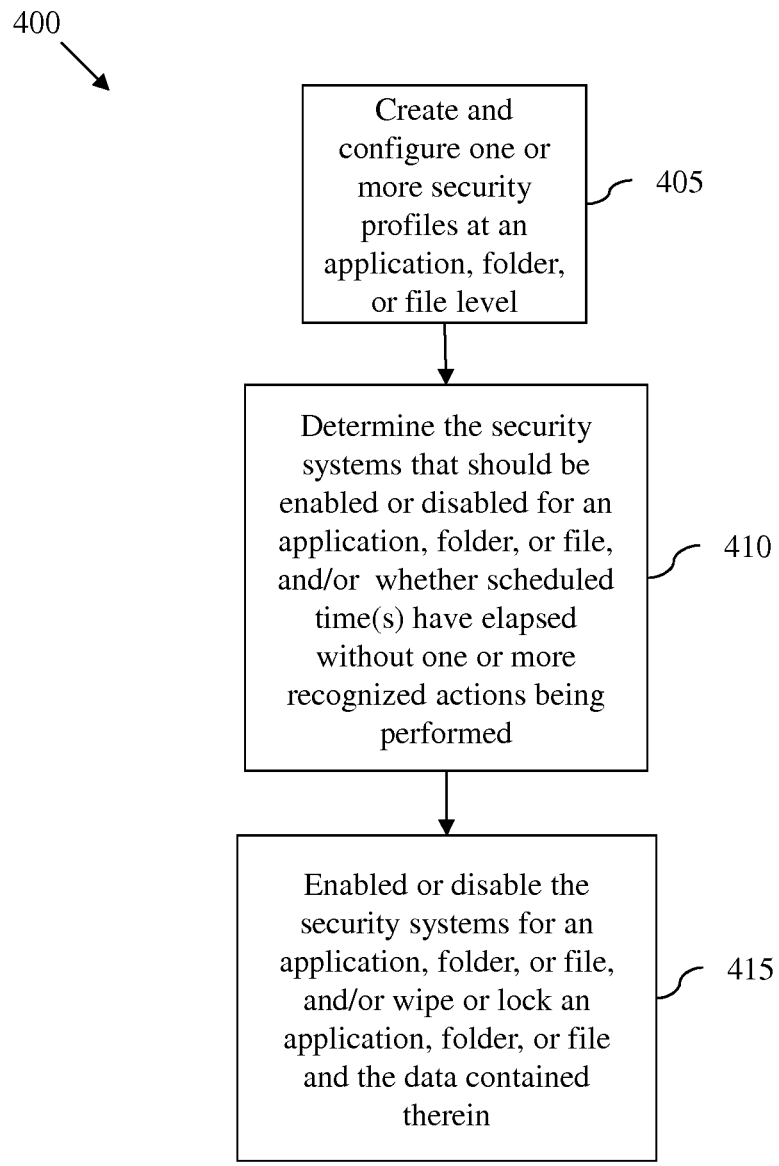

FIGS. 2-4 show exemplary flows for performing aspects of the present invention. The steps of FIGS. 2-4 may be implemented in the environment of FIG. 1, for example. As noted above, the flowchart(s) illustrate the architecture, functionality, and operation of possible implementations of systems, methods, and computer program products as already described herein in accordance with the various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 2 is a flow diagram illustrating a process 200 for providing a decreased or increased standard of security based on connectivity and a geolocation of a mobile device in accordance with aspects of the present invention. At step 205, one or more safe zones may be created on a mobile device (e.g., computing device 14 as described with respect to FIG. 1). For example, creation of the one or more safe zone may include an authorized user of the mobile device selecting creation of a new safe zone using an interface associated with an operating system and/or application (e.g., security tool 50 as described with respect to FIG. 1) installed on the mobile device. In embodiments, the selection of the creation of the one or more safe zones may include selecting to add a new safe zone associated with the mobile device, supplying a designation or name for the safe zone, and saving the new safe zone as an empty and disabled safe zone within a memory (e.g., memory 22A as described with respect to FIG. 1) of the mobile device. The creation of the one or more safe zones is protected by configuration of a password or other token of user authentication applied on the mobile device, such as a default password that must be authenticated to allow the user to use the mobile device, the operating system, and/or the application. It should be understood by those of ordinary skill in the art that the present invention is not limited by the type of mobile device, for example, the mobile device may be any mobile electronic computing device such as a cell phone, point of sale device, tablet computer, laptop computer, etc.

At step 210, the newly created one or more safe zones may be defined. For example, once the one or more safe zones are created in step 205, a user may define the one or more safe zones based on network connectivity and/or a geofence using an interface associated with an operating system and/or application (e.g., security tool 50 as described with respect to FIG. 1) installed on the mobile device. In embodiments, the defining the one or more safe zones based on network connectivity may include selecting one or more connections, e.g., a determined WiFi connection, that identify a safe zone for the mobile device. In alternative embodiments, the defining the one or more safe zones based on network connectivity may include manually adding one or more connections, e.g., a user may select an option to input and add a network connection as a safe zone. The one or more connections may include a WiFi network connection such as a wireless local area network (WLAN) connection for a home or office, a wired connection to another device or LAN, a radio frequency (RF) connection such as RF cable connections or RF wireless network connection, a near field communication (NFC) connection, a proxy connection, etc. It should be understood by those of ordinary skill in the art that the present invention is not limited by the type of connection used to define the safe zone.

In embodiments, the defining the one or more safe zones based on a geofence may include an authorized user of the mobile device (e.g., a location aware mobile device) enabling device location services on their mobile device, and selecting a specific radius around a global positioning system (GPS) coordinate (e.g., a current GPS location of an aware mobile device) or a location on a map such as the user's house or an office building. In alternative embodiments, the defining the one or more safe zones based on a geofence may include an authorized user of the mobile device (e.g., a location aware mobile device) enabling device location on their mobile device and providing boundaries (e.g., predetermined boundaries such as school zones, neighborhood boundaries, township boundaries) around a geographic area. Consequently, the geographic area within the geofence becomes the safe zone for the mobile device.

At step 215, each safe zone created and defined in steps 205 and 210 may be enabled, disabled, or removed. For example, enabling, disabling, or removing a safe zone may include an authorized user of the mobile device enabling, disabling, or removing the safe zone using an interface associated with an operating system and/or application (e.g., security tool 50 as described with respect to FIG. 1) installed on the mobile device. In embodiments, the enabling, disabling, or removing of the safe zone may include selecting the safe zone, choosing to enable, disable, or remove the safe zone, and saving the enabling, disabling, or removal of the safe zone within a memory (e.g., memory 22A as described with respect to FIG. 1) of the mobile device. Multiple safe zones may be selected and grouped together for purposes of enabling, disabling, or removal of the multiple safe zones.

At step 220, one or more security profiles may be created and configured for the mobile device based on the connectivity and/or the geolocation of the mobile device with respect to the created safe zones. For example, a user may create and configure one or more security profiles for the mobile device using an interface associated with an operating system and/or application (e.g., security tool 50 as described with respect to FIG. 1) installed on the mobile device. In embodiments, the one or more security profiles are created and configured as rules such that the operating system and/or application can determine which level of security to apply to the mobile device based on the connectivity and/or the geolocation of the mobile device with respect to the created safe zones. It should be understood that the one or more security profiles may be configured in any number of combinations with respect to the connectivity and the created safe zones. For example, a different security profile may be created with different rules for each created safe zone, a different security profile may be created with different rules for when the geolocation of the mobile device is outside a safe zone and/or within a predetermined distance of a safe zone, a same security profile may be created with the same rules applicable to all safe zones, and a same security profile may be created with the same rules applicable to any instance in which the geolocation of the mobile device is outside a safe zone.

In embodiments, the creating the one or more security profiles may include selecting a security option such as: create security profile for the connectivity and/or geolocation of the mobile device within any of the safe zones; create security profile for the connectivity and/or geolocation of the mobile device within one or more particular safe zones; create security profile for geolocation of the mobile device outside of all safe zones; create security profile for geolocation of the mobile device outside but within a predetermined distance of all safe zones, etc. The configuring the one or more security profiles may include providing one or more rules or levels of security for the selected security option. For example, configuring a security profile for the connectivity and/or geolocation of the mobile device within any of the safe zones may include providing the security profile with a first level of security for the operating system and a second level of security for preventing malware, viruses, and intrusions via connectivity of the mobile device to a network. The first and second level of security may include, for example, one or more of rootkit detectors, process isolation, file permissions, memory protection, development through runtime environments, anti-virus software, firewalls, visual notifications, Turing test software, spam filters, encryption software, battery usage monitors, memory usage monitors, etc. In embodiments, the first and second levels of security may be considered base level manufacturer default protection, and may be pre-selected as defaults for the one or more security profiles.

It should understood that in accordance with aspects of the present invention the first and second levels of security may be de-selected by an authorized user of the mobile device and/or additional levels of security may be provided based on the user's preference for security protection. For example, creating a security profile for the connectivity and/or geolocation of the mobile device outside of all safe zones may include providing the security profile with any number of additional levels (e.g., third, fourth, fifth, and sixth levels) of security for protecting the mobile device from intrusion via an unauthorized user. The third level of security may include a password or other token of user authentication (e.g., biometric identification) used to verify the presence of an authorized user prior to allowing the user access to one or more features (e.g., a specific application or specific file) of the mobile device. The fourth level of security may include a password or other token of user authentication used to verify the presence of an authorized user prior to allowing the user access to operate the mobile device (e.g., locked out of all features of the mobile device). The fifth level of security may include a warning message that is triggered to be sent to a backup device or web site to warn the authorized user of the mobile device that the mobile device is no longer in a safe zone. The sixth level of security may include automatic wiping or locking of the mobile device from any and all use if a password or other token of user authentication is not entered based on timing, as discussed in detail with respect to FIG. 3.

In embodiments, the creating and configuring of the one or more security profiles may further include associating the one or more security profiles with one or more safe zones, geolocation of the mobile device within a predetermined distance of the one or more safe zones, and/or geolocation of the mobile device outside of the one or more safe zones, and saving the one or more security profiles and associations thereof within a memory (e.g., memory 22A as described with respect to FIG. 1) of the mobile device. The associating of the one or more security profiles with one or more safe zones may be, for example, provided in a database or hash table such that the operating system and/or application installed on the mobile device may be configured to determine and access a security profile assigned for each of the enabled safe zones on the mobile device, a geolocation of the mobile device within a predetermined distance of the one or more safe zones, and/or geolocation of the mobile device outside of the one or more safe zones.

At step 225, device location services on the mobile device may be activated, and connectivity of the mobile device and/or a geolocation of the mobile device may be determined. For example, a user may enable device location services using an interface associated with an operating system and/or application (e.g., security tool 50 as described with respect to FIG. 1) installed on the mobile device. Thereafter, the operating system and/or application may be configured to continuously or at predetermined intervals of time determine: (i) one or more connections made with the mobile device (e.g., a WiFi connection between a home network and the mobile device and a wired cable connection between a home personal computer and the mobile device); and/or (ii) a geolocation of the mobile device using a positioning system (e.g., GPS) of the mobile device. The geolocation should be a real world geographic location of the mobile device.

At step 230, the connectivity of the mobile device and/or the determined geolocation of the mobile device may be analyzed with respect to the safe zones enabled on the mobile device. For example, an operating system and/or application (e.g., security tool 50 as described with respect to FIG. 1) installed on the mobile device may be configured to compare the determined one or more connections made with the mobile device and/or the determined geolocation of the mobile device to the each safe zone created, defined, and enabled in steps 205, 210, and 215. When the determined one or more connections and/or the determined geolocation of the mobile device matches (e.g., the one or more connections is a connection associated with a safe zone or the geolocation of the mobile is within a geofence associated with a safe zone) one or more safe zones, the mobile device is determined to be within the one or more safe zones. When the determined one or more connections and/or the determined geolocation of the mobile device does not match the one or more safe zones, the mobile device is determined to be outside of the one or more safe zones. Optionally, the operating system and/or application may be further configured such that when the mobile device is determined to be outside of the one or more safe zones, the geolocation of the mobile device is used to determine whether the mobile device is with a predetermined distance of the one or more safe zones.

At step 235, security systems for the mobile device are enabled or disabled based on the security profiles stored on the mobile device and the analysis of the connectivity and/or the geolocation of the mobile device with respect to the enabled safe zones. For example, an operating system and/or application (e.g., security tool 50 as described with respect to FIG. 1) installed on the mobile device may be configured to enable or disable security systems (e.g., password or other token of user authentication systems, anti-viral software, firewall protection, time based automatic wiping or locking systems, etc.) based on the security profiles saved to the mobile device in step 220 and the analysis of the connectivity and/or the geolocation of the mobile device with respect to the enabled safe zones performed in step 230.

As such, when the mobile device is determined to be within the one or more safe zones, the operating system and/or application is configured to use the one or more security profiles associated with the one or more safe zones that the mobile device is determined to be within to enable or disable the security systems of the mobile device based on the configured rules set for the associated one or more security profiles. When the mobile device is determined to be outside of the one or more safe zones, the operating system and/or application is configured to use the one or more security profiles associated with a geolocation of the mobile device outside of a safe zone to enable or disable the security systems of the mobile device based on the configured rules set for the associated one or more security profiles. Optionally, when the mobile device is determined to be within a predetermined distance of the one or more safe zones, the operating system and/or application is configured to use the one or more security profiles associated with a geolocation of the mobile device within a predetermined distance of a safe zone to enable or disable the security systems of the mobile device based on the configured rules set for the associated one or more security profiles.

Accordingly, with a safe zone enabled on the mobile device it may be possible in embodiments of the present invention for a user to operate the mobile device without having to enter a password or other token of user authentication when the user tries to perform any operation on the mobile device and the geolocation of the mobile device is within a safe zone. Additionally, it may be possible in embodiments of the present invention to trigger an authorized user action (e.g., request a password or other token of user authentication, send a warning message to a backup device or web site to warn the mobile device is no longer in a safe zone, and/or perform automatic wiping or locking of the device from any and all use) by the mobile device when the user tries to perform any operation on the mobile device, the geolocation of the mobile device is determined to be outside a safe zone, and/or the geolocation of the mobile device is determined to be outside a safe zone and a predetermined amount of time has expired.

FIG. 3 is a flow diagram illustrating a process 300 for invoking an automatic wipe or lock of a mobile device in accordance with aspects of the present invention. At step 305, an automatic wipe or lock security profile may be created and configured for the mobile device. For example, a user may create and configure an automatic wipe or lock security profile for the mobile device using an interface associated with an operating system and/or application (e.g., security tool 50 as described with respect to FIG. 1) installed on the mobile device. In embodiments, the creating the automatic wipe or lock security profile may include selecting a security option such as automatic wipe of all data on the mobile device, an automatic wipe of only specified data on the mobile device, as described with respect to FIG. 4, an automatic lock of the mobile device such that the mobile device is locked from any and all use, or an automatic lock of the mobile device such that the mobile device is locked from only specified features or data on the mobile device, as described with respect to FIG. 4.

In embodiments, the automatic wipe or lock security profile may be configured based on the geolocation of the mobile device with respect to the created safe zones, as described in detail with respect to FIG. 2, or irrespective of the geolocation of the mobile device. The configuring the automatic wipe or lock security profile may also include providing a schedule for initiating the automatic wipe or lock of the mobile device. For example, an authorized user of the mobile device may configure the automatic wipe or lock security profile such that the mobile device will automatically wipe or lock the mobile device every four hours, every hour, every day at a specified time, or even multiple times adhering to a specific schedule (e.g., lock the mobile device at 10:00 am and 3:00 pm daily).

The configuring the automatic wipe or lock security profile may also include providing an action that needs to be performed by an authorized user of the mobile device prior to the scheduled time(s) to prevent the automatic wipe or lock of the mobile device from being initiated. For example, the user may select or input an action such as providing a password or other token of user authentication, providing a secondary password or other secondary token of user authentication that is different from a password or other token of user authentication used to access and operate the mobile device (e.g., an application on the mobile device with a concealed system for requesting a secondary password or other secondary token of user authentication), operate one or more features of the mobile device (e.g., access a specified application or perform a specific call to a specified contact number), and perform a sequence of events (e.g., provide the password or other token of user authentication and send a specific text message to a specified contact number), etc.

In additional or alternative embodiments, the configuring of the automatic wipe or lock security profile may also include providing a warning message that is triggered to be sent to a backup device or web site at a predetermined time prior to the scheduled time(s). The warning message may be configured to warn the authorized user of the impending automatic wipe or lock of the mobile device at the scheduled time(s). For example, the automatic wipe or lock security profile may be configured to send a preformed text message or email to another mobile device of the authorized user that warns the authorized user of the impending wipe or lock of their mobile device at the scheduled time(s).

At step 310, a determination is made as to whether one or more actions provided within the automatic wipe or lock security profile has been performed. For example, an operating system and/or application (e.g., security tool 50 as described with respect to FIG. 1) installed on the mobile device may be configured to compare one or more actions performed on the mobile device to the one or more actions provided at step 305 within the automatic wipe or lock security profile. When the one or more of the actions performed on the mobile device matches the one or more actions provided within the automatic wipe or lock security profile, the process proceeds to step 315. When the one or more actions performed on the mobile device do not match the one or more actions provided within the automatic wipe or lock security profile, the process proceeds to optional step 320.

At step 315, the mobile device waits for a next scheduled time provided within the automatic wipe or lock security profile to expire before proceeding back to step 310. For example, the operating system and/or application (e.g., security tool 50 as described with respect to FIG. 1) installed on the mobile device may be configured to determine that the one or more actions performed on the mobile device have been performed prior to a next scheduled time(s) provided at step 305 within the automatic wipe or lock security profile. Consequently, the operating system and/or application may be configured to determine that the mobile device has not been lost or stolen and enters a waiting period for the next scheduled time(s) provided within the automatic wipe or lock security profile to expire prior to proceeding back to step 310 and monitoring for a subsequent one or more actions to be performed that again match one or more actions provided within the automatic wipe or lock security profile.

At step 320, optionally, a determination is made as to whether a predetermined time provided for within the automatic wipe or lock security profile that is prior to the scheduled time(s) has elapsed. For example, an operating system and/or application (e.g., security tool 50 as described with respect to FIG. 1) installed on the mobile device may be configured to compare a current time on the mobile device or external to the mobile device (e.g., a time obtained via a network connection) to a predetermined time provided in step 305 for the automatic wipe or lock security profile that is prior to the scheduled time(s) to determine whether the predetermined time has elapsed.

At step 325, optionally, when the predetermined time has elapsed, a warning message may be provided to a backup device or web site of the authorized user of the mobile device. For example, an operating system and/or application (e.g., security tool 50 as described with respect to FIG. 1) installed on the mobile device may be configured such that when the predetermined time has elapsed, a warning message may be sent to a backup device or web site of the authorized user. The warning message may be configured to warn the authorized user of an impending automatic wipe or lock of the mobile device at the scheduled time(s).

At step 330, a determination is made as to whether the scheduled time(s) of the automatic wipe or lock security profile has elapsed. For example, an operating system and/or application (e.g., security tool 50 as described with respect to FIG. 1) installed on the mobile device may be configured to compare a current time on the mobile device or external to the mobile device (e.g., a time obtained via a network connection) to the scheduled time(s) provided in step 305 for the automatic wipe or lock security profile to determine whether the scheduled time(s) of the automatic wipe or lock security profile has elapsed.

At step 335, when the scheduled time(s) has elapsed, a security protocol is initiated in accordance with the automatic wipe or lock security profile. For example, an operating system and/or application (e.g., security tool 50 as described with respect to FIG. 1) installed on the mobile device may be configured such that when the scheduled time(s) has elapsed, (i) an automatic wipe of all data on the mobile device, (ii) an automatic wipe of only specified data on the mobile device, as described with respect to FIG. 4, (iii) an automatic lock of the mobile device such that the mobile device is locked from any and all use, or (iv) an automatic lock of the mobile device such that the mobile device is locked from only specified features or data on the mobile device, as described with respect to FIG. 4, is performed in accordance with the automatic wipe or lock security profile created and configured in step 305.

In embodiments, automatic wipe of all data on the mobile device may include a factory reset of the mobile device that includes erasing index information for each file, and marking those bits as ready to be overwritten with new data at anytime. In additional or alternative embodiments, automatic wipe of all data on the mobile device may further include overwriting encryption keys (e.g., hardware encryption keys), and/or writing to all of the mobile device's free storage (e.g., memory 22A) benign or irrelevant data. It should be understood by those of ordinary skill in the art that the present invention is not limited by the type of automatic wipe performed on the mobile device.

In embodiments, the lock of the mobile device such that the mobile device is locked from any and all use may include locking the mobile device such that an unauthorized user cannot access any features of the phone (e.g., cannot proceed past a first interface comprising input for a password or other token of user authentication). In additional or alternative embodiments, the lock of the mobile device may further include powering down the mobile device such that the mobile device cannot be powered up without a specific activating mechanism such as an external security device or sequence of button toggles, and/or preventing any connectivity to the mobile device for example via an external device. It should be understood by those of ordinary skill in the art that the present invention is not limited by the type of lock performed on the mobile device. Accordingly, with an automatic wipe or lock security profile enabled on the mobile device it may possible, in embodiments, for the mobile device to automatically wipe or lock all data or specified portions of data within the mobile device based on timing such that the data does not fall into the hands of an unauthorized user.

FIG. 4 is a flow diagram illustrating a process 400 for configuring protection levels at an application, folder, or file level in accordance with aspects of the present invention. At step 405, one or more security profiles may be created and configured at an application, folder, or file level. For example, a user may create and configure one or more security profiles for the mobile device using an interface associated with an operating system and/or application (e.g., security tool 50 as described with respect to FIG. 1) installed on the mobile device. In embodiments, the one or more security profiles are created and configured as rules such that the operating system and/or application (e.g., security tool 50 as described with respect to FIG. 1) installed on the mobile device can determine, which level of security to apply to an application, folder, or file based on (i) the connectivity and/or the geolocation of the mobile device with respect to the created safe zones (as described with respect to FIG. 2), and/or (ii) whether one or more actions were performed prior to the schedule time(s) (as described with respect to FIG. 2).

At step 410, analysis and determinations are performed in view of the one or more security profiles as described with respect steps 225 and 230 of FIG. 2 and steps 310, 315, 320, 325, and 330 of FIG. 3 to determine (i) the security systems that should be enabled or disabled for an application, folder, or file based on the analysis of the connectivity and geolocation of the mobile device with respect to the enabled safe zones, and/or (ii) whether scheduled time(s) have elapsed without one or more recognized actions being performed. At step 415, the security systems are enabled or disabled for an application, folder, or file, and/or an application, folder, or file and the data contained therein are wiped or locked in accordance with the determinations made in step 410. Accordingly, in accordance with these aspects of the present invention, an authorized user may be able to configure a security system for their mobile device at a more granular level to specify, which applications, files, or folders receive which level of security, and which applications, files, or folders become wiped or locked.

In embodiments, the invention provides a method that performs the process of the invention on a subscription, advertising, and/or fee basis. That is, a service provider, such as a Solution Integrator, could offer to provide location-based and time-based security functionality on a network. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for providing location-based and time-based security on a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure having computer executable code tangibly embodied on a computer readable storage medium having programming instructions operable to:

create and define one or more safe zones for a mobile device;

enable at least one of the one or more safe zones;

create and configure a security profile for the at least one of the one or more safe zones;

determine at least one of connectivity and a geolocation of the mobile device;

analyze the at least one of the connectivity and the geolocation of the mobile device with respect to the at least one of the one or more safe zones; and enable or disable one or more security systems for locking the mobile device and preventing retrieving of information stored in the mobile device based on the security profile and the analysis of the at least one of the connectivity and the geolocation of the mobile device with respect to the at least one of the one or more safe zones, wherein the locking of the mobile device includes powering down the mobile device, and wherein the mobile device cannot be powered up without a connection to an external security device.

2. The method of claim 1, wherein the defining the one or more safe zones comprises:

selecting one or more connections to the mobile device as the one or more safe zones; and defining a geofence around a geographic area as the one or more safe zones.

3. The method of claim 2, wherein the defining the geofence includes one of selecting a specific radius around a global positioning system (GPS) coordinate within the geographic area, selecting a specific radius around a location on a map that corresponds to the geographic area, and providing boundaries around the geographic area.

4. The method of claim 2, wherein the creating the security profile for the at least one of the one or more safe zones comprises selecting a security option from at least one of (i) creating the security profile for the connectivity and the geolocation of the mobile device within any of the enabled one or more safe zones, (ii) creating the security profile for the connectivity and the geolocation of the mobile device within a particular safe zone of the one or more safe zones, (iii) creating the security profile for the geolocation of the mobile device outside of all of the one or more safe zones, and (iv) creating the security profile for the geolocation of the mobile device outside of all of the one or more safe zones but within a predetermined distance of a particular safe zone of the one or more safe zones.

5. The method of claim 1, wherein the creating the security profile for the connectivity and the geolocation of the mobile device within any of the one or more safe zones comprises providing the security profile with a first level of security for an operating system of the mobile device and a second level of security for encrypting data on the mobile device for preventing malware, viruses and intrusions via connectivity of the mobile device to a network.

6. The method of claim 5, wherein the creating the security profile for the geolocation of the mobile device outside of all of the one or more safe zones comprises providing the security profile with a third level of security that includes a password or other token of user authentication used to verify a presence of an authorized user prior to allowing a user access to operate the mobile device outside of all of the safe zones.

7. The method of claim 6, wherein the enabling or disabling the one or more security systems comprises disabling the third level of security when the analysis of the at least one of the connectivity and the geolocation of the mobile device determines that either the connectivity of the mobile device matches the one or more connections for any of the one or more safe zones, or the geolocation of the mobile device is within the geofence defining the geographic area of any of the one or more safe zones.

8. The method of claim 6, wherein the enabling or disabling the one or more security systems comprises enabling the third level of security when the analysis of the at least one of the connectivity and the geolocation of the mobile device determines that both the connectivity of the mobile device does not match the one or more connections for each of the one or more safe zones, and the geolocation of the mobile device is outside of the geofence defining the geographic area of each of the one or more safe zones.

9. The method of claim 5, wherein the first and second levels of security include at least one of requiring a password, anti-virus software and firewall protection.

10. The method of claim 9, further comprising the programming instructions being operable to create different security profiles for each created safe zone.

11. The method of claim 10, further comprising the programming instructions being operable to require a password for the creating and defining of the one or more safe zones.

12. The method of claim 1, wherein a service provider at least one of creates, maintains, deploys and supports the computer infrastructure.

\* \* \* \* \*